United States Patent
Morin et al.

(10) Patent No.: US 10,167,082 B2
(45) Date of Patent: Jan. 1, 2019

(54) IN-VEHICLE POSITION DETECTION AND CONFIGURATION OF VEHICLE COMPONENTS

(71) Applicant: BOMBARDIER INC., Dorval (CA)

(72) Inventors: Alexis Morin, Montreal (CA); Marc Kirmoyan, Westmount (CA); Brad Nolen, Montreal (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 15/526,658

(22) PCT Filed: Nov. 9, 2015

(86) PCT No.: PCT/IB2015/058647
§ 371 (c)(1),
(2) Date: May 12, 2017

(87) PCT Pub. No.: WO2016/075611
PCT Pub. Date: May 19, 2016

(65) Prior Publication Data
US 2017/0313426 A1      Nov. 2, 2017

Related U.S. Application Data

(60) Provisional application No. 62/079,718, filed on Nov. 14, 2014.

(51) Int. Cl.
*G08G 1/02* (2006.01)
*B64D 11/00* (2006.01)
(Continued)

(52) U.S. Cl.
CPC .... *B64D 11/0015* (2013.01); *B64D 11/00155* (2014.12); *H04L 67/12* (2013.01);
(Continued)

(58) Field of Classification Search
CPC .................................................. B64D 11/0015
(Continued)

(56) References Cited

U.S. PATENT DOCUMENTS 7,725,129 B2   5/2010   Grunhold
8,284,100 B2   10/2012  Varanian et al.
(Continued)

FOREIGN PATENT DOCUMENTS

CN   102892197   1/2013
CN   103402259   11/2013
(Continued)

OTHER PUBLICATIONS

Jaegeol Yim, "A smartphone indoor positioning method", International Journal of Smart Home, vol. 7, No. 5 (2013) pp. 9-18.
(Continued)

*Primary Examiner* — Santiago Garcia
(74) *Attorney, Agent, or Firm* — Norton Rose Fulbright Canada LLP

(57) ABSTRACT

There is described herein a method and system for the configuration of vehicle management components using in-vehicle position detection. The in-vehicle position detection may also be used for providing a floor plan of the vehicle. In some embodiments, in-vehicle position detection may be used concurrently for configuring vehicle management components and for providing floor plans.

20 Claims, 14 Drawing Sheets

(51) Int. Cl.
*H04W 4/02* (2018.01)
*H04W 4/04* (2009.01)
*H04L 29/08* (2006.01)
*H04W 4/80* (2018.01)
*H04W 4/021* (2018.01)

(52) U.S. Cl.
CPC ............ *H04W 4/022* (2013.01); *H04W 4/023* (2013.01); *H04W 4/043* (2013.01); *H04W 4/046* (2013.01); *H04W 4/80* (2018.02)

(58) Field of Classification Search
USPC ........................................................ 340/945
See application file for complete search history.

(56) References Cited

U.S. PATENT DOCUMENTS

| | | | |
|---|---|---|---|
| 8,336,664 | B2 | 12/2012 | Wallace et al. |
| 8,504,219 | B2 | 8/2013 | Kim et al. |
| 8,527,146 | B1 | 9/2013 | Jackson et al. |
| 8,744,482 | B2 | 6/2014 | Margalef et al. |
| 2011/0117903 | A1 | 5/2011 | Bradley |
| 2011/0241854 | A1* | 10/2011 | Matsui ................. H04B 1/3822 340/426.1 |
| 2013/0273938 | A1 | 10/2013 | Ng et al. |
| 2013/0289800 | A1 | 10/2013 | Gautama et al. |
| 2014/0067956 | A1* | 3/2014 | Tsunoda .................. H04L 67/22 709/204 |
| 2014/0195125 | A1 | 7/2014 | Siegel et al. |
| 2014/0242910 | A1 | 8/2014 | Umlauft et al. |
| 2015/0142248 | A1* | 5/2015 | Han .................... G01C 21/3602 701/23 |
| 2015/0193885 | A1* | 7/2015 | Akiva .................... G06Q 40/08 705/4 |
| 2015/0256668 | A1* | 9/2015 | Atkinson ............ H04M 1/6075 455/418 |
| 2017/0298659 | A1* | 10/2017 | Watanabe ............... E05B 77/54 |

FOREIGN PATENT DOCUMENTS

| | | |
|---|---|---|
| DE | 102006006719 | 8/2007 |
| EP | 2730479 | 5/2014 |
| WO | 2014113882 | 7/2014 |

OTHER PUBLICATIONS

International Search Report and Written Opinion issued in PCT Application No. PCT/IB2015/058647.

* cited by examiner

IN-VEHICLE POSITION DETECTION AND CONFIGURATION OF VEHICLE COMPONENTS

CROSS-REFERENCE TO RELATED APPLICATIONS

The present application claims priority under 35 U.S.C. 119(e) to U.S. provisional patent application No. 62/079,718, filed on Nov. 14, 2014, the contents of which are hereby incorporated by reference.

TECHNICAL FIELD

The present invention relates to the field of in-vehicle position detection using short range communications, and more particularly to detecting changes in position while in transit and triggering events related to the detected changes in position.

BACKGROUND OF THE ART

Aircrafts are beginning to rely on personal devices to control various components of an aircraft, such as settings related to in-flight entertainment, climate control, and trip information. These settings are generally linked to each passenger's seat or position in the aircraft. In order to determine the passenger's seat position, an on-screen layout of passenger accommodations is presented to the passenger. Each passenger is asked to select the seat in which they are currently sitting manually. When a passenger changes seats, the process of manually selecting a seat must be repeated.

Improvement is therefore desirable.

SUMMARY

There is described herein a method and system for the configuration of vehicle management components using in-vehicle position detection. The in-vehicle position detection may also be used for providing a floor plan of the vehicle. In some embodiments, in-vehicle position detection may be used concurrently for configuring vehicle management components and for providing floor plans.

In accordance with a first broad aspect, there is provided a method for configuring vehicle management components, the vehicle comprising at least a first set of vehicle management components associated with a first location and a second set of vehicle management components associated with a second location. The method comprises determining a position of a personal device in relation to the first location on a basis of an indoor positioning system within the vehicle; when the personal device is determined to be in proximity to the first location, causing at least one vehicle management component in the first set of vehicle management components to acquire a given status on a basis of a user selection; determining, while the vehicle is in transit, that the position of the personal device has moved out of proximity of the first location and into proximity of the second location; and upon determining, triggering an event related to the at least one vehicle management component in the first set of vehicle management components.

In accordance with another broad aspect, there is provided a system for configuring vehicle management components, the vehicle comprising at least a first set of vehicle management components associated with a first location and a second set of vehicle management components associated with a second location. The system comprises a memory; a processor coupled to the memory; and an application stored in the memory. The application is executable by the processor for determining a position of a personal device in relation to the first location on a basis of an indoor positioning system within the vehicle; when the personal device is determined to be in proximity to the first location, causing at least one vehicle management component in the first set of vehicle management components to acquire a given status on a basis of a user selection; determining, while the vehicle is in transit, that the position of the personal device has moved out of proximity of the first location and into proximity of the second location; and upon determining, triggering an event related to the at least one vehicle management component in the first set of vehicle management components.

In some embodiments of the method and/or system, triggering an event comprises transferring the given status of the at least one vehicle management component in the first set of vehicle management components to an equivalent at least one vehicle management component in the second set of vehicle management components. Alternatively, triggering an event comprises displaying a message on the personal device related to the given status of the at least one vehicle management component. In some embodiments, the at least one vehicle management component comprises at least one of video entertainment and audio entertainment, the given status of the at least one of video entertainment and audio entertainment is active, and triggering an event comprises modifying the given status to paused.

In some embodiments of the method and/or system, causing at least one vehicle management component in the first set of vehicle management components to acquire a given status comprises activating at least one of video entertainment and audio entertainment of an in-vehicle entertainment system. In some embodiments, the at least one of video entertainment and audio entertainment is in a paused state when the transfer of the given status of the at least one cabin management component is triggered.

In some embodiments of the method and/or system, causing at least one vehicle management component in the first set of vehicle management components to acquire a given status comprises activating at least one of heating, ventilation, and air conditioning at a given setting. In some embodiments, causing at least one vehicle management component in the first set of vehicle management components to acquire a given status comprises registering at least one of a meal and a beverage selection.

In some embodiments of the method and/or system, the method and/or application also comprises displaying on the personal device a floor plan of the vehicle, and displaying an indicator showing the position of the device in relation to the first location and the second location. In some embodiments, displaying on the personal device a floor plan of the vehicle comprises updating the position of the personal device when it has been determined that the position of personal device has moved out of proximity of the first set of vehicle management components and into proximity of the second set of vehicle management components.

In some embodiments of the method and/or system, the user selection is provided on the personal device.

In some embodiments of the method and/or system, the indoor position system comprises a set of wireless emitters at known locations within the vehicle.

In accordance with another broad aspect, there is provided a method for providing a floor plan for a vehicle. The method comprises determining a position of a personal device in relation to the floor plan of the vehicle; associating a first seat in the floor plan with the personal device when the personal device is determined to be in proximity to the a first seat; displaying the floor plan and an indicator showing the first seat associated with the personal device; determining on a basis of signals from wireless emitters positioned at known locations within the vehicle, while the vehicle is in transit, that the position of the personal device has moved out of proximity of the first seat and into proximity of a second seat; associating the second seat in the floor plan with the personal device; and updating the floor plan by displaying the indicator for the second seat.

In accordance with yet another broad aspect, there is provided a system for providing a floor plan for a vehicle. The system comprises a memory; a processor coupled to the memory; and an application stored in the memory. The application is executable by the processor for determining a position of a personal device in relation to the floor plan of the vehicle; associating a first seat in the floor plan with the personal device when the personal device is determined to be in proximity to the a first seat; displaying the floor plan and an indicator showing the first seat associated with the personal device; determining on a basis of signals from wireless emitters positioned at known locations within the vehicle, while the vehicle is in transit, that the position of the personal device has moved out of proximity of the first seat and into proximity of a second seat; associating the second seat in the floor plan with the personal device; and updating the floor plan by displaying the indicator for the second seat.

In some embodiments of the method and/or system, associating a first seat in the floor plan with the personal device comprises assigning passenger settings to the first seat on a basis of a user selection on the personal device.

In some embodiments of the method and/or system, assigning passenger settings comprises causing at least one vehicle management component associated with the first seat in the vehicle to acquire a given status.

In some embodiments of the method and/or system, updating the floor plan comprises associating the passenger settings to the second seat.

In some embodiments of the method and/or system, updating the floor plan comprises triggering an event related to the at least one vehicle management component associated with the first seat. Triggering an event may comprise transferring the given status of the at least one vehicle management component associated with the first seat to an equivalent at least one vehicle management component associated with the second seat. Alternatively, triggering an event comprises displaying a message on the personal device related to the given status of the at least one vehicle management component. In some embodiments, the at least one vehicle management component associated with the first seat comprises at least one of video entertainment and audio entertainment, the given status of the at least one of video entertainment and audio entertainment is active, and triggering an event comprises modifying the given status to paused.

In accordance with some embodiments, the method for providing a floor plan for a vehicle and the method for configuring vehicle management components may be embodied on a computer readable medium comprising program code executable by a processor for performing the steps of the method.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
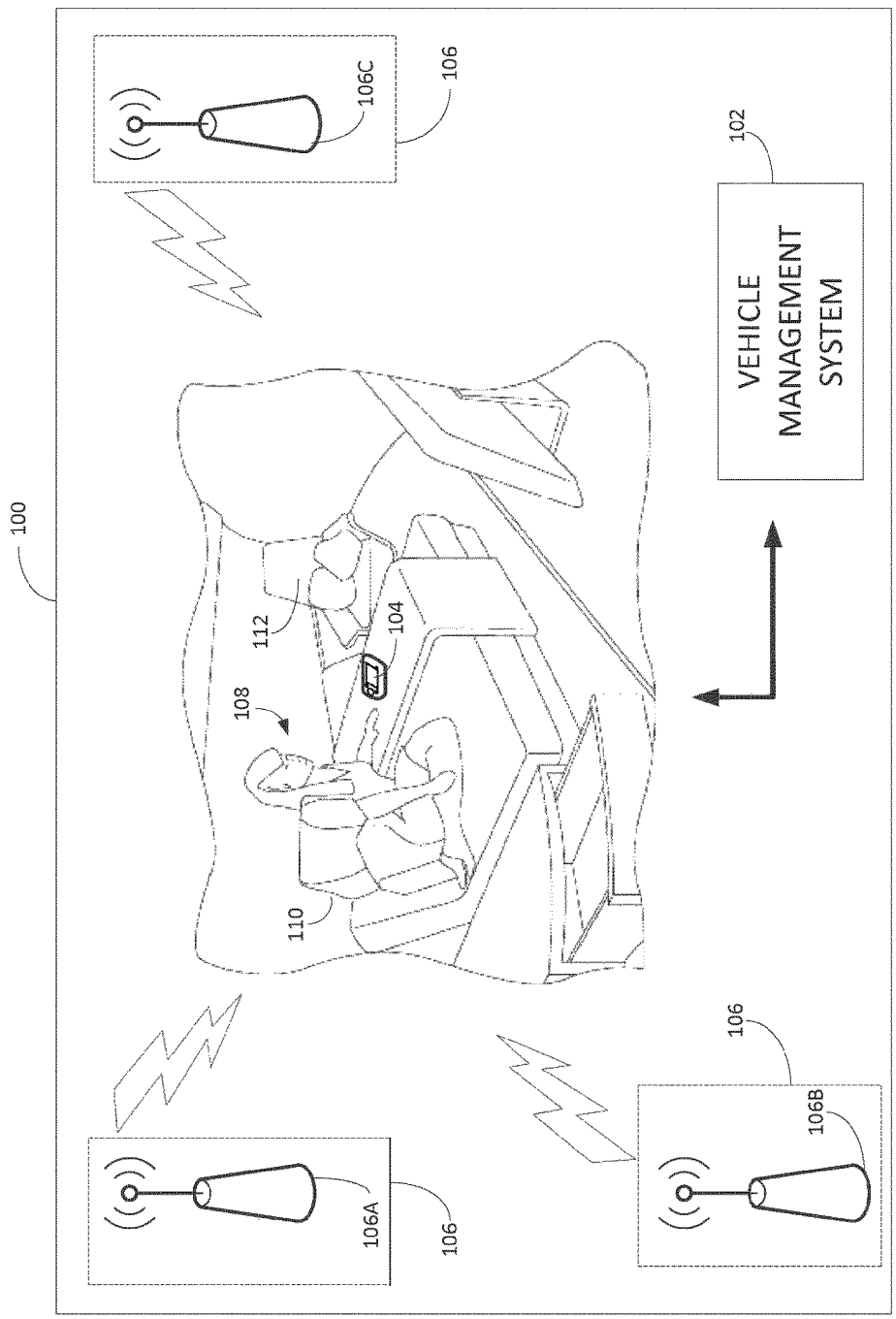
FIG. 1 illustrates an exemplary vehicle to which the methods and systems of the present disclosure may be applied.

FIG. 1 illustrates a vehicle 100 comprising a vehicle management system 102 and at least one personal device 104. The vehicle 100 may be any vehicle capable of transporting at least one passenger 108 and having a plurality of locations (or seating positions) 110, 112 for the at least one passenger 108, such as an airplane, a train, a subway, a boat, a bus, a limousine, a car, and the like. The personal device 104 may be any mobile electronic device such as a laptop computer, a personal digital assistant (PDA), a smartphone, a smart watch, a tablet or the like, adapted to communicate with one or more other wireless devices via a wireless connection. The personal device 104 may also be a smart card (contact-type or contact-less), a chip card, an integrated circuit card, a digital identification card, an NFC tag, or any device having an RFID integrated therein. The chip or integrated circuit may be worn or carried by an individual passenger, for example positioned within an ID badge or within an article of the passenger's clothing, such as their shoes.

The vehicle management system 102 is operatively connected to the personal device 104 via a wireless connection. In some embodiments, the vehicle management system 102 is a cabin management system, such as those found on aircraft. The vehicle management system 102 may also take the form of any other type of management system capable of managing one or more vehicle management components in the vehicle 100. Examples of vehicle management components are in-vehicle entertainment, climate control, and trip information. For example, vehicle management components may comprise display screens for watching movies or other video content, audio sources such as radio and streaming music services, lights, shades, heating, ventilation, air-conditioning, and other galley equipment. The vehicle management components may be provided individually for each passenger seat or vehicle location, or collectively for a group of passenger seats or vehicle locations. A seat may be a traditional chair, a position on a divan or couch, a position on a bed, a location within a lavatory, or any other area in the vehicle where a passenger may take position. The vehicle management system 102 may provide customized in-vehicle amenities with regards to the vehicle environment per vehicle location. For example, in business jets, a first set of vehicle management components may be provided for a dining area seat, whereas a second set of vehicle management components may be provided for a divan area seat.

Inside the vehicle 100, there is provided an indoor positioning system (IPS) 106 used to locate the personal device 104 within the vehicle 100. In some embodiments, the IPS 106 relies on nodes with known positions, which emit signals to provide location data to the personal device 104. The nodes may emit signals using Wi-Fi, Bluetooth, Zigbee, or other wireless technologies. For example, the IPS 106 may be embodied by a plurality of wireless emitters 106a, 106b, 106c provided at fixed and known locations in the vehicle 100. Each wireless emitter 106a, 106b, 106c may be assigned a unique identification number (UID). Received signal strength indication (RSSI) may be used as a measurement of the power level received by the personal device 104 from the wireless emitters 106a, 106b, 106c in order to approximate distance based on the relationship between transmitted and received signal strength, whereby the transmitted signal strength remains constant. In this embodiment, at least three wireless emitters 106a, 106b, 106c are provided to serve as independent measures for trilateration. The three wireless emitters 106a, 106b, 106c may be used for determining one dimensional and/or two dimensional positions. One or more additional wireless emitter may be used for determining three dimensional positions, such as in vehicles 100 with two or more levels. The wireless emitters 106a, 106b, 106c may also rely on Time of arrival (ToA) or Angle of arrival (AoA) instead of RSSI, and location may be calculated mathematically by approximating signal propagation and finding angles using triangulation. More advance statistical procedures, such as Bayesian statistical analysis and Kalman filtering may also be used for mathematical modeling. The IPS 106 may also rely on magnetic positioning or dead reckoning to determine the position of the personal device 104. In some embodiments, the IPS 106 may be composed of a positioning system that simply detects the presence of a mobile device without the need to compute a distance measurement. For example, the IPS 106 may comprise individual wireless emitters provided at each seat. Each personal device 104 may detect the presence of one of the individual wireless emitters upon receipt of a signal. Identification data may be provided in the emitted signal such that location is determined based on the ID of the wireless emitter from which the signal was received. In some embodiments, the nodes in the IPS 106 may transmit and/or receive signals. For example, a set of receiving antennas may act as readers for smart cards, RFID tags, or the like.

Figure 2:
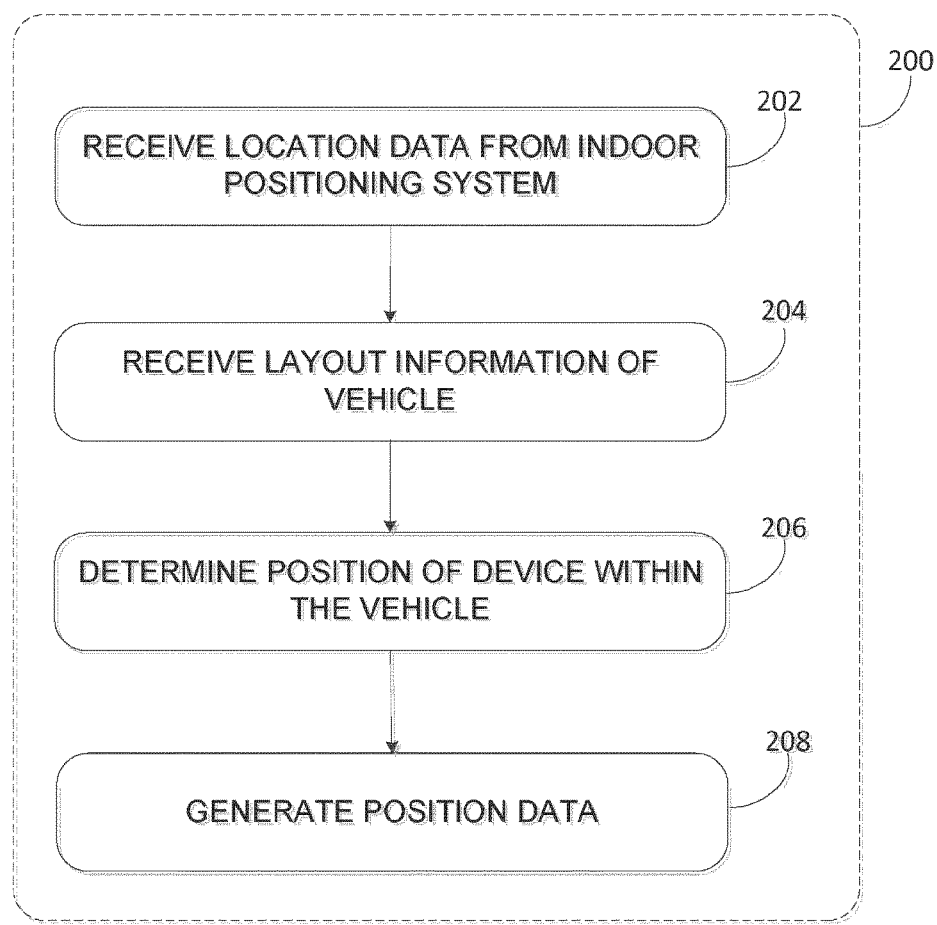
FIG. 2 illustrates a flowchart of an exemplary method for detecting a position of a personal device in relation to a location or seat in the vehicle.

Position detection may be performed by the personal device 104. FIG. 2 is a flowchart of an exemplary method 200 for in-vehicle position detection. As per step 202, the location data is received from the IPS 106. As per step 204, layout information for the vehicle 100 is also received by the personal device 104. The layout information comprises data used by the personal device 104 in combination with the location data received from the IPS 106 in order to determine its position within the vehicle, and more particularly, its position in relation to locations (or seats) within the vehicle. For example, the layout information may include context information, such as a floor plan or seating plan of the vehicle. It may also include information regarding the IPS 106, such as the position, UIDs, and transmitted signal strength of the wireless emitters 106a, 106b, 106c. The layout information may be provided by the vehicle management system 102 to the personal device 104. Alternatively, the personal device 104 may be configured to retrieve the layout information from a remote storage device. Based on the location data and the layout information, the position of the personal device 104, or its proximity to one or more locations within the vehicle 100 is determined, as per step 206. Position data may be generated by the personal device 104 in accordance with step 208. The position data represents the position of the personal device 104 within the vehicle and may comprise an absolute position, a relative position, a seat location, a seating area, or any other predefined area or zone within the vehicle. The position data may be used by the personal device 104 for the configuration of vehicle management components or it may be transmitted to another entity, such as the vehicle management system 102, for this purpose.

Figure 3A:
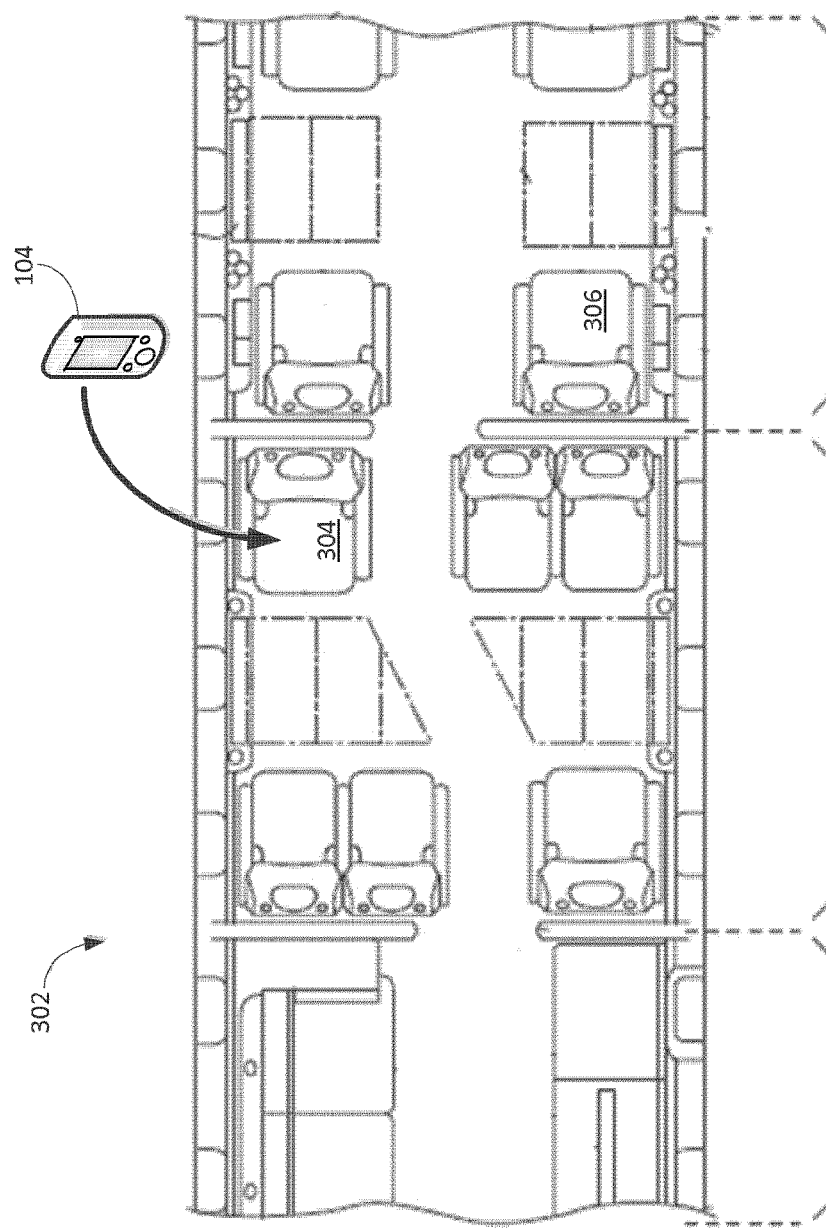
FIG. 3a illustrates an exemplary floor plan with an associated personal device.
Figure 3B:
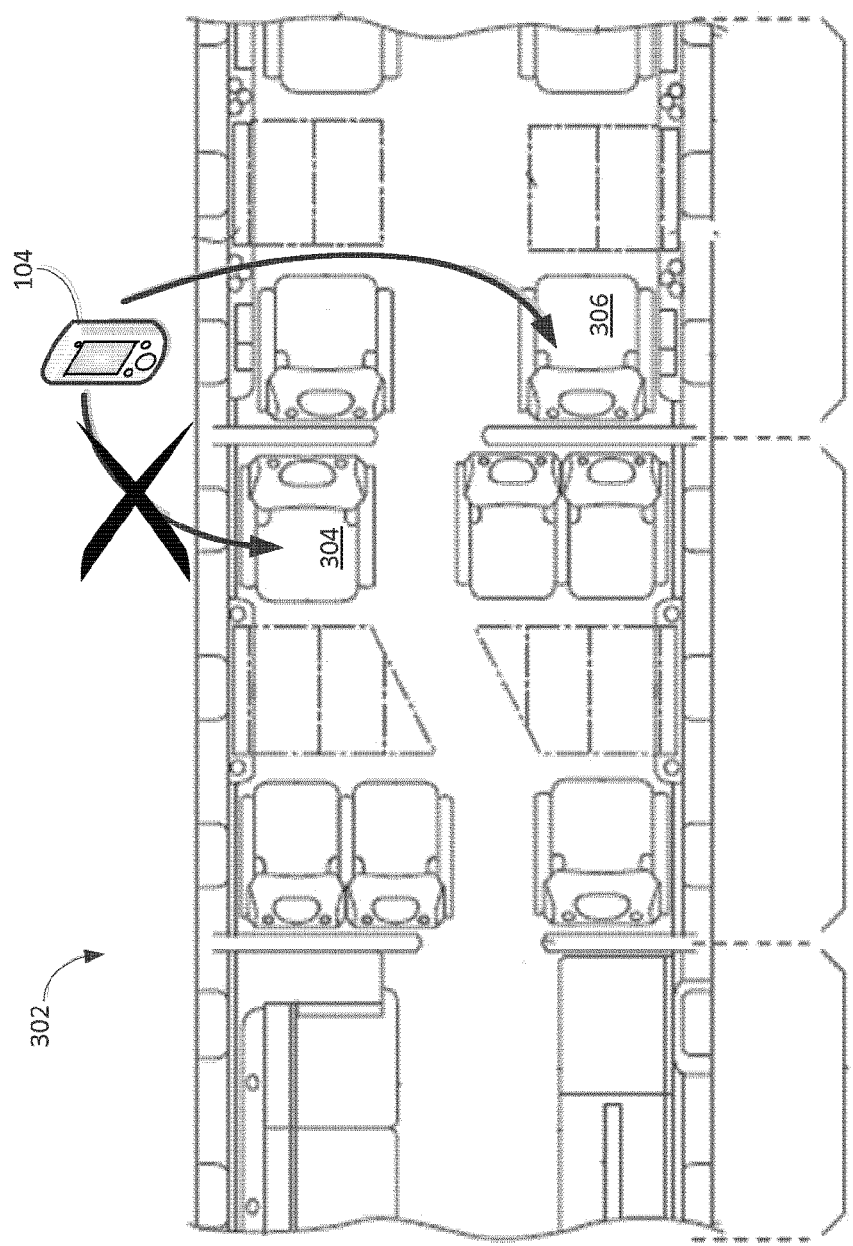
FIG. 3b illustrates the floor plan of FIG. 3a with the association of the personal device being transferred from a first seat to a second seat.

FIG. 3a is an exemplary vehicle floor plan 302. Based on the location data and the layout data, personal device 104 is determined to be in proximity to first location 304, and personal device 104 is associated with a first location 304 (or seat) in the floor plan 302. The detected position may be confirmed or updated continuously or at a given interval to determine if there is a change in position of the personal device 104 within the vehicle 100, For example, if the passenger 108 were to change location in the vehicle 100 by moving from the first location 304 to a second location 306, while carrying the personal device 104, the personal device 104 may be configured to automatically update its position data within the vehicle 100. FIG. 3b illustratively shows the association between personal device 104 and first location 304 being cancelled and replaced by an association between personal device 104 and second location 306. The position of the personal device 104 may thus be updated in real time as the passenger 108 moves around in the vehicle 100, while the vehicle is in transit.

Figure 4:
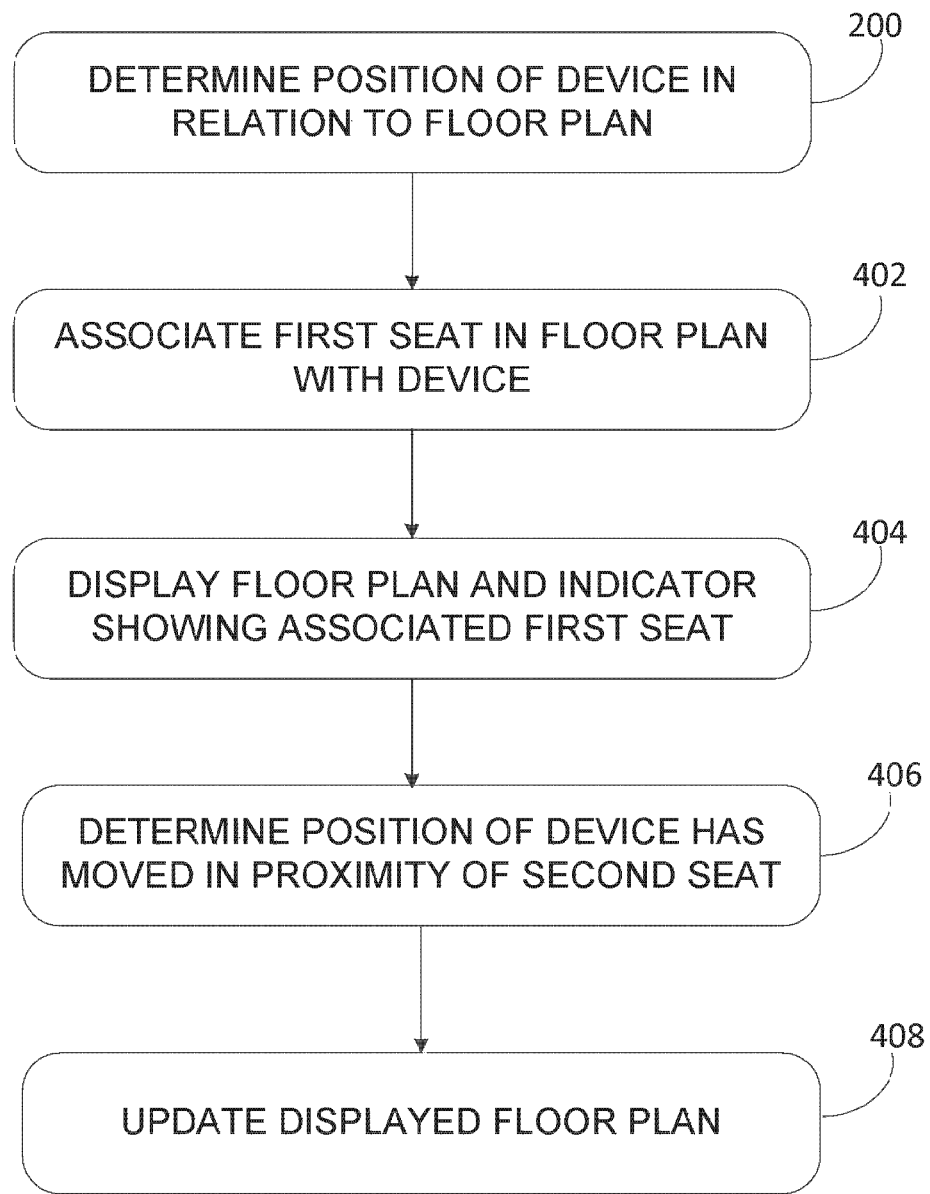
FIG. 4 is a flowchart of an exemplary method for providing a floor plan for a vehicle.
Figure 5:
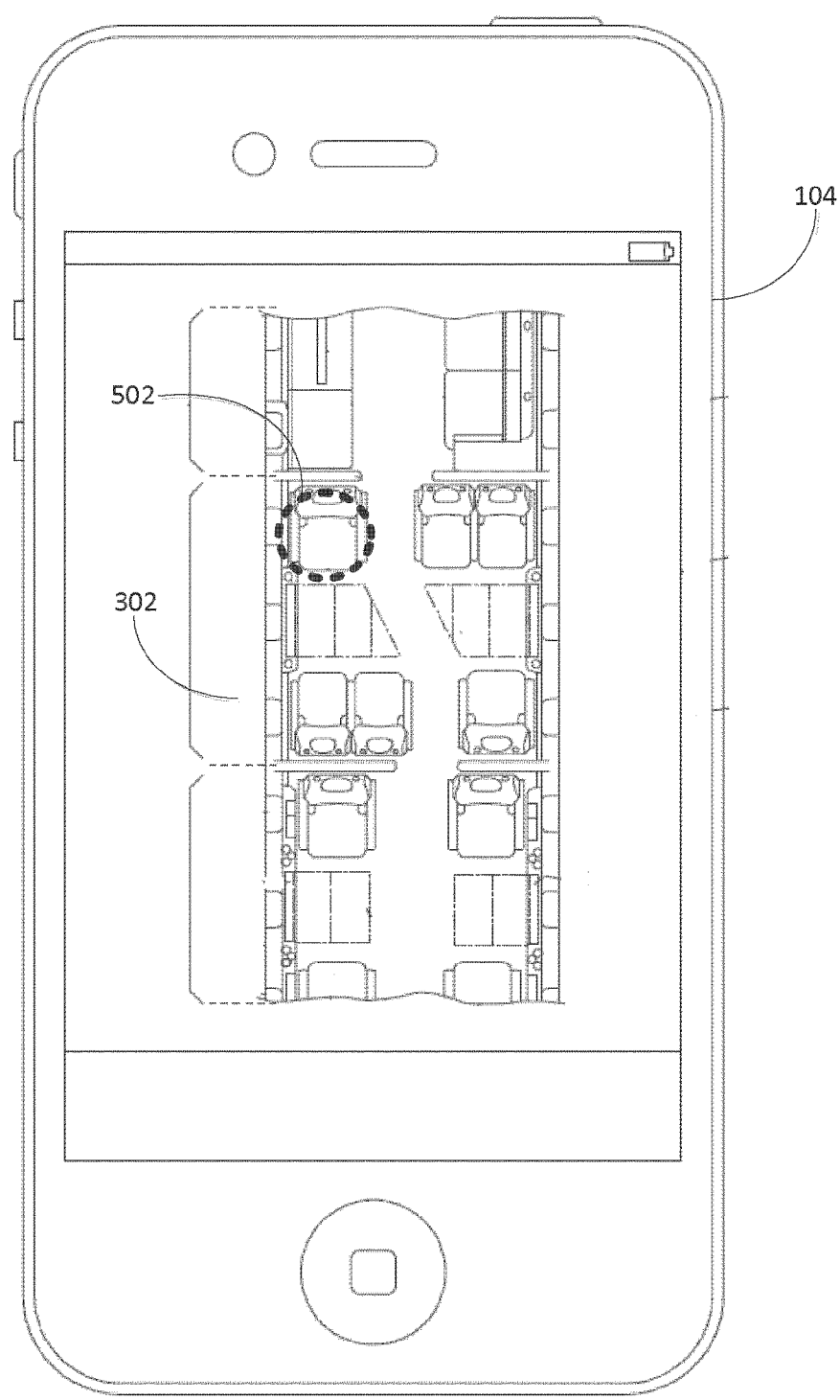
FIG. 5 illustrates a personal device having floor plan and indicator displayed thereon, in accordance with an embodiment.
Figure 6:
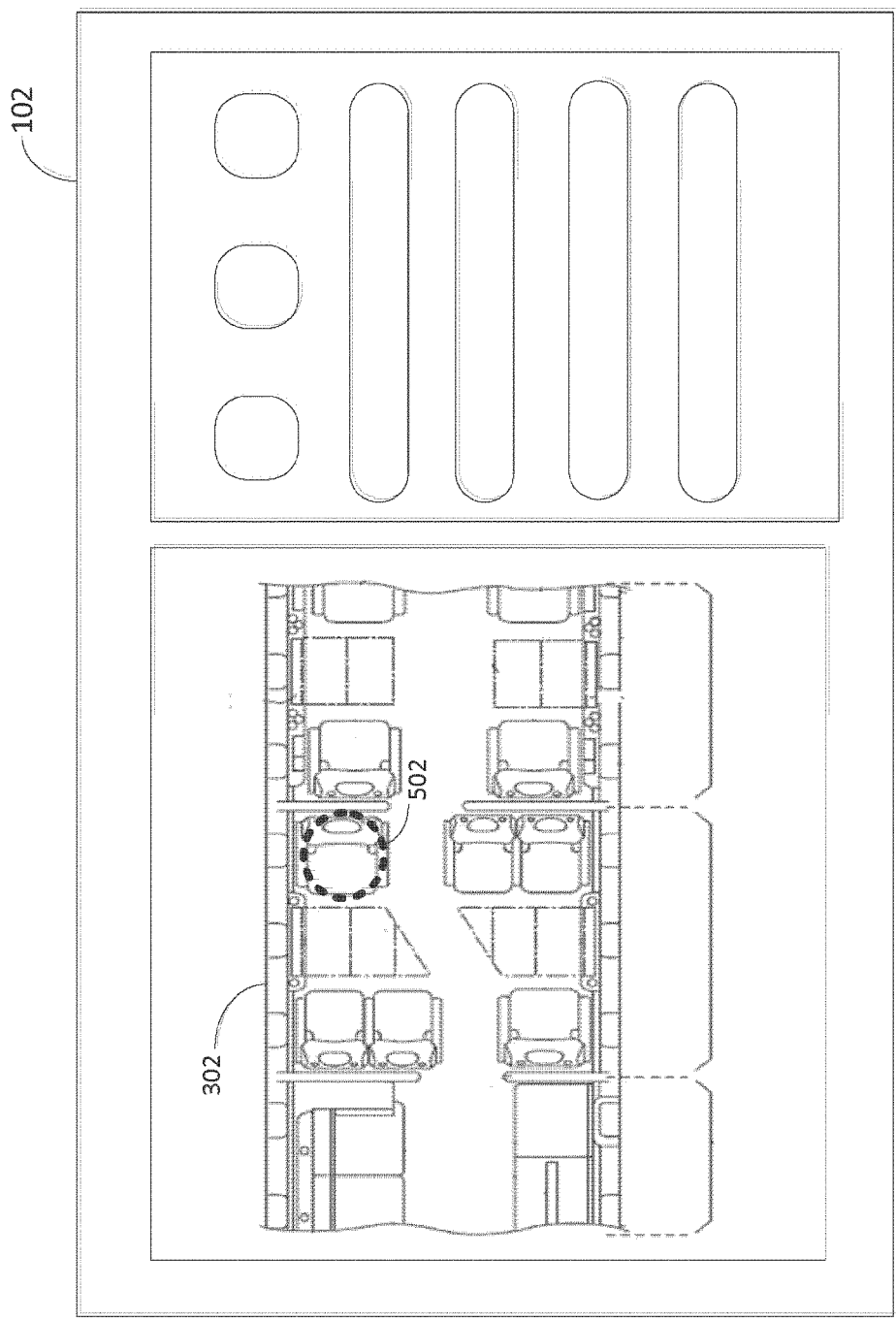
FIG. 6 illustrates a vehicle management system having floor plan and indicator displayed thereon, in accordance with an embodiment.

FIG. 4 is a flowchart of an exemplary method for providing a floor plan 302 for the vehicle 100. As per step 200, the position of the personal device 104 is determined in relation to the floor plan 302. In step 402, a given seat (ex. 304) in the floor plan 302 is associated with the personal device 104 when the position of the personal device is determined to be in proximity to the given seat. The floor plan 302 is displayed, as per step 404, on the personal device 104 as illustrated in FIG. 5, and/or on the vehicle management system 102 as illustrated in FIG. 6, and an indicator 502 is also displayed with the floor plan 302 to show the first seat 304 associated with the personal device 104. The indicator may take various forms, such as a symbol, color, shading, text, outline, or any other visual cue that may be used to highlight the association between the first seat 304 and the personal device 104. Step 406 comprises determining, while the vehicle 100 is in transit, that the position of the personal device 104 has moved out of proximity of the first seat 304 and into proximity of a second seat (ex. 306). As per step 408, the displayed floor plan 302 is updated by displaying the indicator 502 on the second seat 306.

Figure 7:
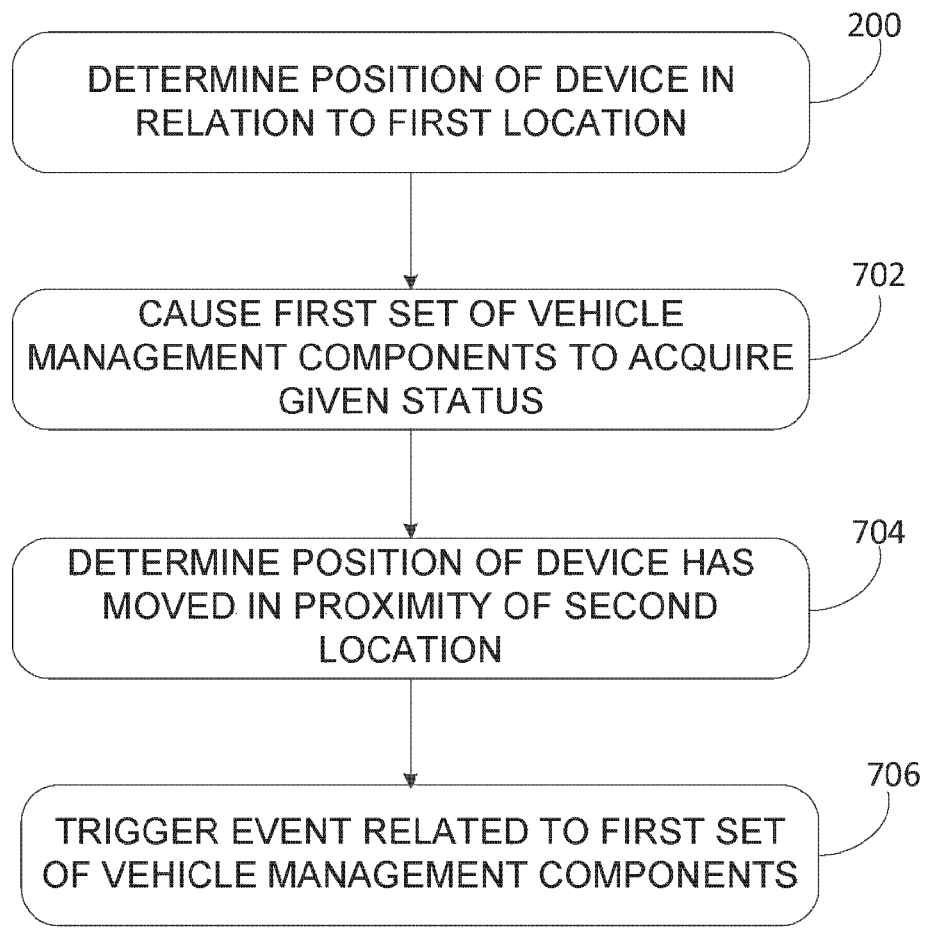
FIG. 7 is a flowchart of an exemplary method for configuring vehicle management components in a vehicle.

Each location 304, 306 in the vehicle 100 may be associated with a set of vehicle management components. If the personal device 104 is associated with the first location 304, the personal device 104 may also be associated with a first set of vehicle management components for the first location 304. These vehicle management components may then be configured by the passenger 108 on the personal device 104. FIG. 7 is a flowchart of an exemplary method for configuring the vehicle management components. Step 200 refers to determining the position of the personal device 104 in relation to the first location 304, as described above. As per step 702, one or more of the vehicle management components associated with the first location 304 may acquire a given status based on a user selection on the personal device 104. Acquiring a status may comprise turning a given component on or off, setting the component to one of a plurality of levels (such as low, medium high), or setting the component to a given intensity. Acquiring a status may also comprise a particular selection of video content, audio content, meal choice, beverage choice, etc. For example, the user may turn on the lights, set a dimming or shading level for a window, select a movie, or set the air conditioning at his location 304. In another example, the user may select a soft drink or a vegetarian meal for consumption during the trip. The user may also select at which point during the trip the meal and/or beverage selections are to be provided. These selections may be made directly on the personal device 104 via a user interface (not shown). The selections are recorded and associated with the user's location 304.

As per step 704, it may be determined, while the vehicle 100 is in transit, that the position of the personal device 104 has moved out of proximity of the first location 304 and into proximity of the second location 306. This determination may trigger an event related to the first set of vehicle management components, as per step 706. In some embodiments, triggering an event comprises transferring the status of one or more components of the first set of vehicle management components to an equivalent component in the second set of vehicle management components. For example, the light settings from the first location 304 may be transferred to the second location 306 in order to have the same light settings at the second location 306. The settings for window shading and/or electrical dimming of windows may also be transferred to the second location 306. In another example, any active entertainment content, such as music, movies, tv, news, etc, from the first location 304 may also be transferred to the second location 306. Food or beverage selections associated with the first location 304 may also be transferred to the second location 306 so that service of the food or beverage may occur at the new location.

Active video or audio content may or may not be paused by the passenger 108 before the passenger changes location. In some embodiments, triggering an event comprises pausing active video or audio content at the first location as a result of detecting the change in location of the personal device 104. More generally, the event may be any form of modifying the playback status of the video or audio content, such as pausing, restarting, rewinding a period of time, fast forwarding a period of time, etc. In some embodiments, triggering an event comprises displaying a message on the personal device 104 related to the status of the vehicle management component. For example, the message may ask the passenger 108 if active video or audio content should be paused. In another example, the message may ask the passenger 108 if the active video or audio content should be transferred to the new location. More generally, the message may ask the passenger 108 if the status of any of the components from the first set of vehicle management components should be modified and/or transferred to the new location. As indicated above, triggering the event as per step 706 may comprise automatically transferring the status of a first component in a first set at a first location to a second component in a second set at a second location.

In some embodiments, the system is configured to determine that the position of the personal device 104 has moved out of proximity of the first location 304 without moving into proximity of another location with vehicle management components. For example, this may occur if the passenger goes to the bathroom or is simply circulating in the aisle of the vehicle. Moving out of proximity of the first location 304 may be sufficient to trigger an event related to the first set of vehicle management components, such as pausing or otherwise modifying the playback of active entertainment content, lowering light settings, or displaying a message on the personal device 104 related to the status of the vehicle management components. In other embodiments, the event is triggered only if the personal device 104 has moved into proximity of another set of vehicle management components. In some embodiments, the event may be triggered only if the personal device 104 has been out of proximity of the first location 304 for a predetermined amount of time, such as 5 seconds, 30 seconds, 2 minutes, or any other desired time setting. Similarly, in some embodiments, the event may be triggered only if the personal device 104 has moved into proximity to the second location 306 for a predetermined amount of time. Other criteria may also be used in combination with proximity in order to trigger the event related to the vehicle management components.

Figure 8:
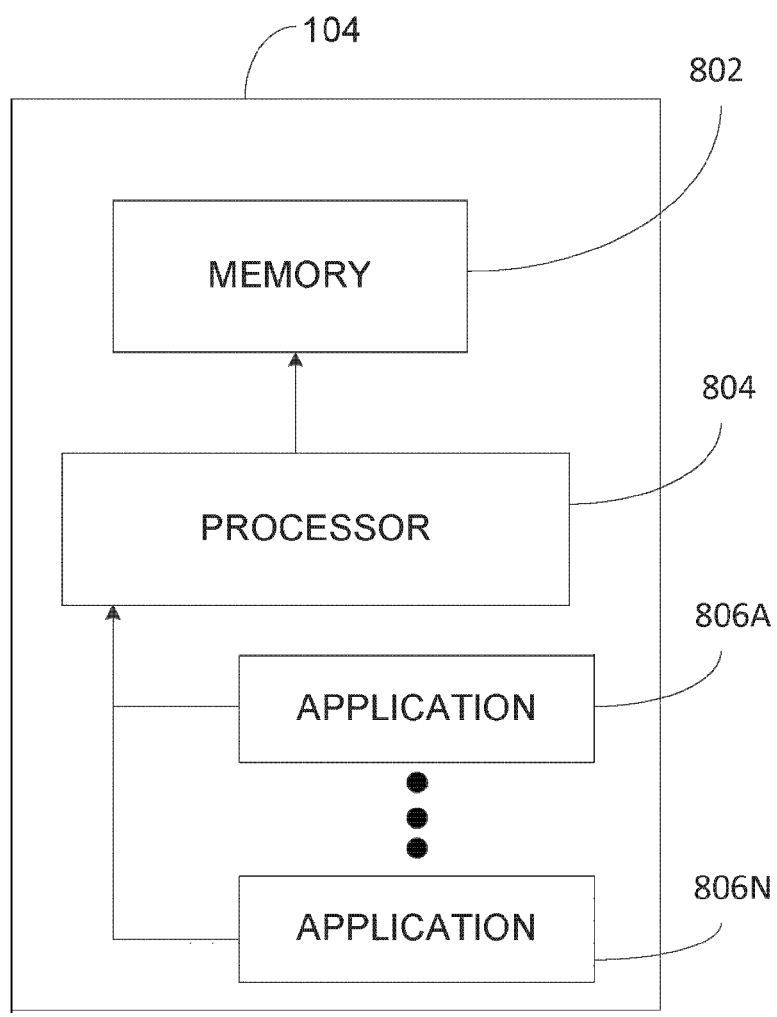
FIG. 8 is a block diagram of an exemplary embodiment of a personal device.

FIG. 8 is an exemplary embodiment of the personal device 104. The personal device 104 may comprise, amongst other things, a plurality of applications 806a . . . 806n running on a processor 804 coupled to a memory 802. One such application may be configured for configuring vehicle management components. Another application may be configured for providing a floor plan of the vehicle. In some embodiments, a single application may be provided to perform both vehicle management component configuration and floor plan display. It should be understood that while the applications 806a . . . 806n presented herein are illustrated and described as separate entities, they may be combined or separated in a variety of ways.

The memory 802 accessible by the processor 804 may receive and store data, such as but not limited to location data, layout information, position data, vehicle management component configurations, and floor plans. The memory 802 may be a main memory, such as a high speed Random Access Memory (RAM), or an auxiliary storage unit, such as a hard disk, a floppy disk, or a magnetic tape drive. The memory 802 may be any other type of memory, such as a Read-Only Memory (ROM), flash memory, or optical storage media such as a videodisc and a compact disc. The processor 804 may access the memory 802 to retrieve data. The processor 804 may be any device that can perform operations on data. Examples are a central processing unit (CPU), a front-end processor, a microprocessor, and a network processor. The applications 806a . . . 806n are coupled to the processor 804 and configured to perform various tasks.

Figure 9:
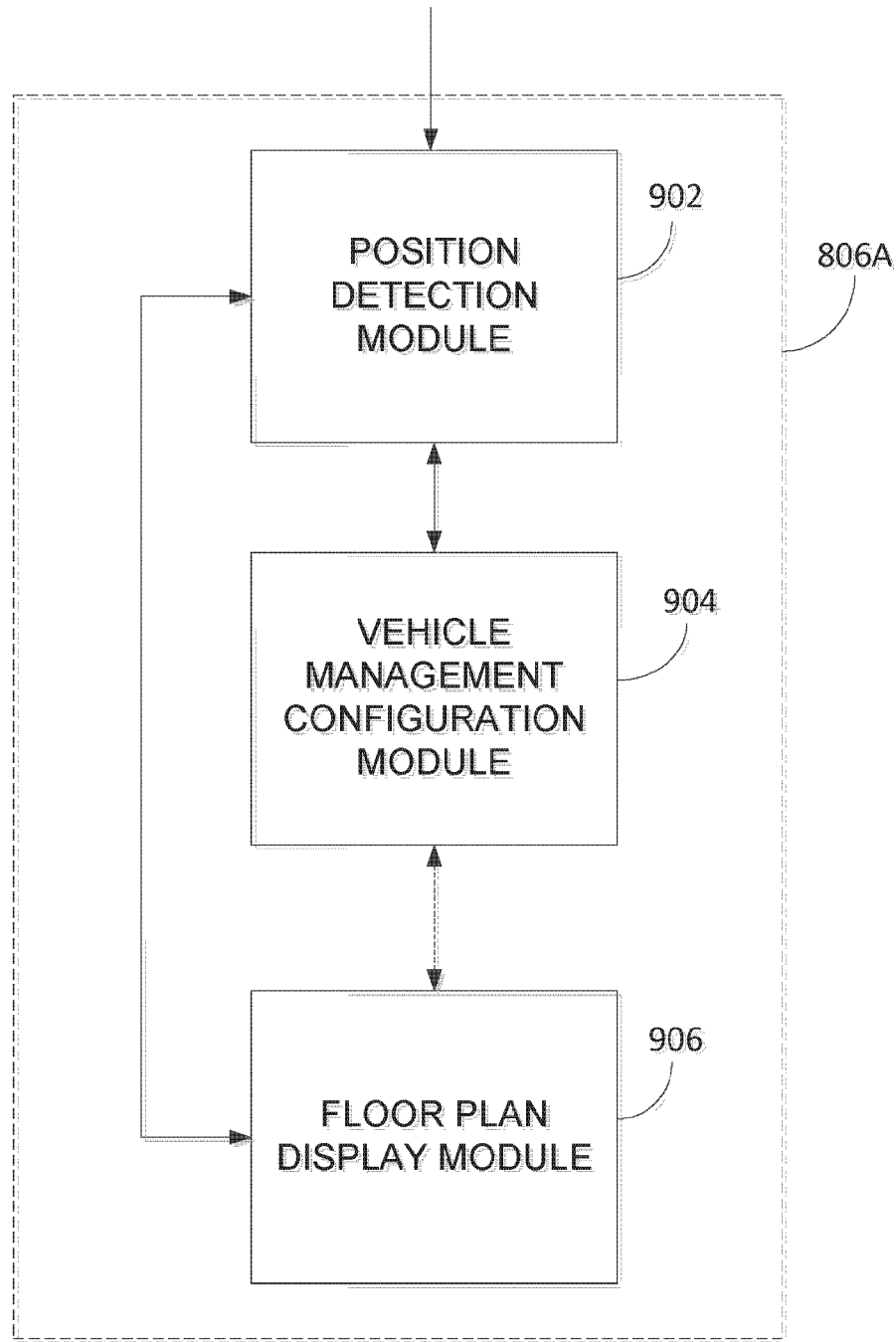
FIG. 9 is a block diagram of an exemplary application running on the personal device.

FIG. 9 is an exemplary embodiment of an application 806a running on the processor 804. The application 806a illustratively comprises a position detection module 902, a vehicle management configuration module 904, and a floor plan display module 906. The position detection module 102 is configured to determine the position of the personal device 104 in relation to a floor plan or to a location in the vehicle. In some embodiments, the position detection module 102 may be configured to receive location data from the IPS 106, as per step 202 of the method of FIG. 2, receive layout information of the vehicle 100, as per step 204, and determine the position of the personal device 104 within the vehicle 100, as per step 206. In other embodiments, the position detection module 902 may be configured to detect the position of the personal device 104 using other detection techniques, such as magnetic positioning or dead reckoning.

Position data may be generated by the position detection module 902, as per step 208, and provided to at least one of the vehicle management configuration module 904 and the floor plan display module 906. The position detection module 902 may also be configured to determine, while the vehicle is in transit, that the position of the personal device has moved out of proximity of the first location or seat and into proximity of the second location or seat, as per steps 406 and 704 of the methods illustrated in FIGS. 4 and 7, respectively. Updated position data may thus be provided to at least one of the vehicle management configuration module 904 and the floor plan display module 906.

The vehicle management configuration module 904 receives the position data from the position detection module 902 and is configured to cause at least one vehicle management component associated with the first location to acquire a given status on a basis of a user selection on the personal device, as per step 702. Upon receipt of updated position data indicating a change in position for the personal device from the first location to the second location, the vehicle management configuration module 904 is configured to trigger an event related to the at least one vehicle management component associated with the first location.

The event may be a change in status of the at least one vehicle management component, a transfer to another vehicle management component associated with the second location, or the transmission/display of a message on the personal device 104. The message may inquire as to whether the status of the least one vehicle management component should be changed (i.e. stopped, turned off, cancelled, paused, etc), or transferred to another location. A user-based selection within the message may then cause the vehicle management configuration module 904 to modify the status of the vehicle management component and/or transfer the status to another vehicle management component.

The position data generated by the position detection module 902 may also be provided to the floor plan display module 906. The floor plan display module 906 may be configured to associate a first seat or location in the floor plan with the personal device, as per step 402 of the method of FIG. 4, and display the floor plan and an indicator showing the first seat or location associated with the personal device, as per step 404. Upon receipt of updated position data indicating that the personal device has changed locations within the vehicle, the floor plan display module 906 may be configured to update the floor plan by displaying the indicator on another seat in the floor plan.

Figure 10A:
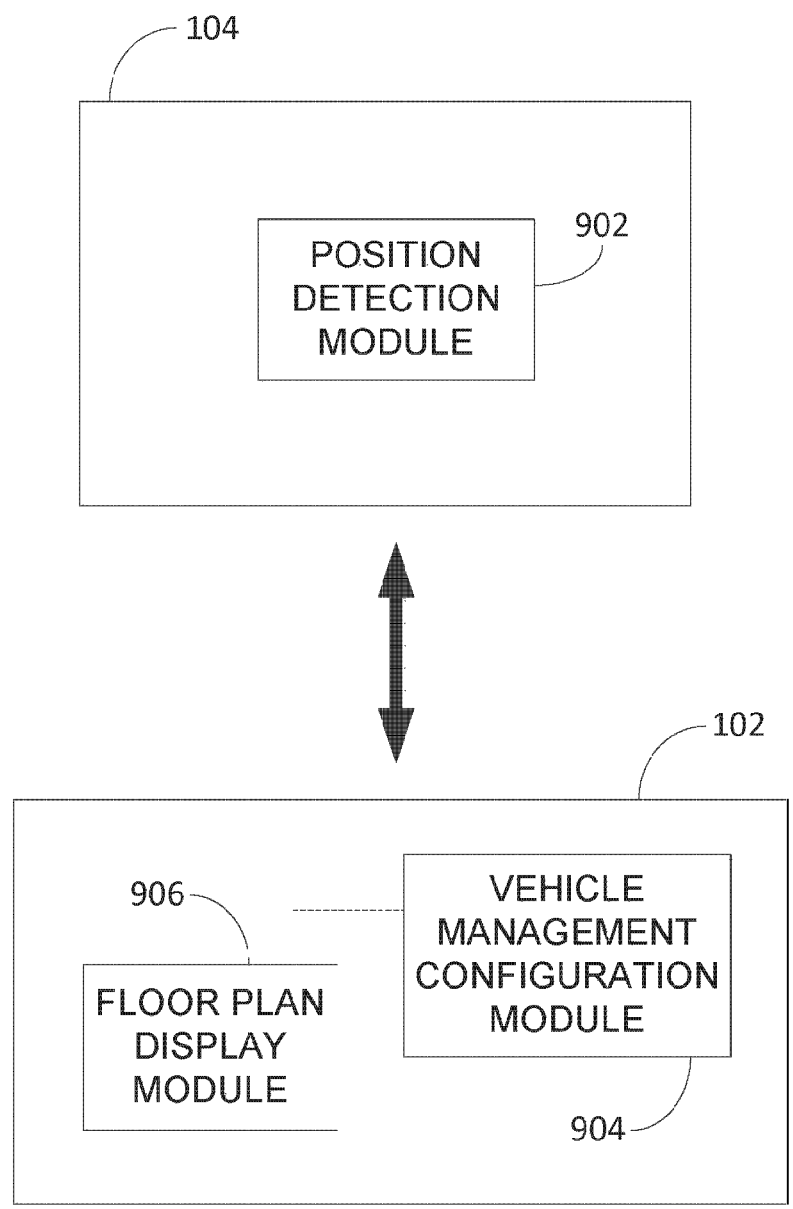
FIG. 10a is a block diagram of an exemplary configuration for the modules illustrated in FIG. 9.

In the example illustrated in FIG. 9, the position detection module 902, vehicle management configuration module 904, and floor plan display module 906 are shown to all reside in a single application 806*a*, on the personal device 104. In some embodiments, the position detection module 902, vehicle management configuration module 904, and floor plan display module 906 may be provided in separate applications 806*a*, . . . 806*n* that reside on the personal device 104. In some embodiments, the separate applications may reside in part on the personal device 104 and in part on the vehicle management system 102. For example, FIG. 10*a* illustrates an embodiment where the position detection module 902 is provided on the personal device 104 and the vehicle management configuration module 904 and the floor plan display module 906 are provided on the vehicle management system 102. The position data may be transmitted wirelessly from the personal device 104 to vehicle management system 102, The floor plan display module 906 may cause the floor plan to be displayed on a display device of the vehicle management system 102, as illustrated in FIG. 6, and it may transmit a signal back to the personal device 104 to display the floor plan on the personal device 104, as illustrated in FIG. 5. Settings or selections made by the user on the personal device 104 may be transmitted to the vehicle management system 102 for use by the vehicle management configuration module 904.

Figure 10B:
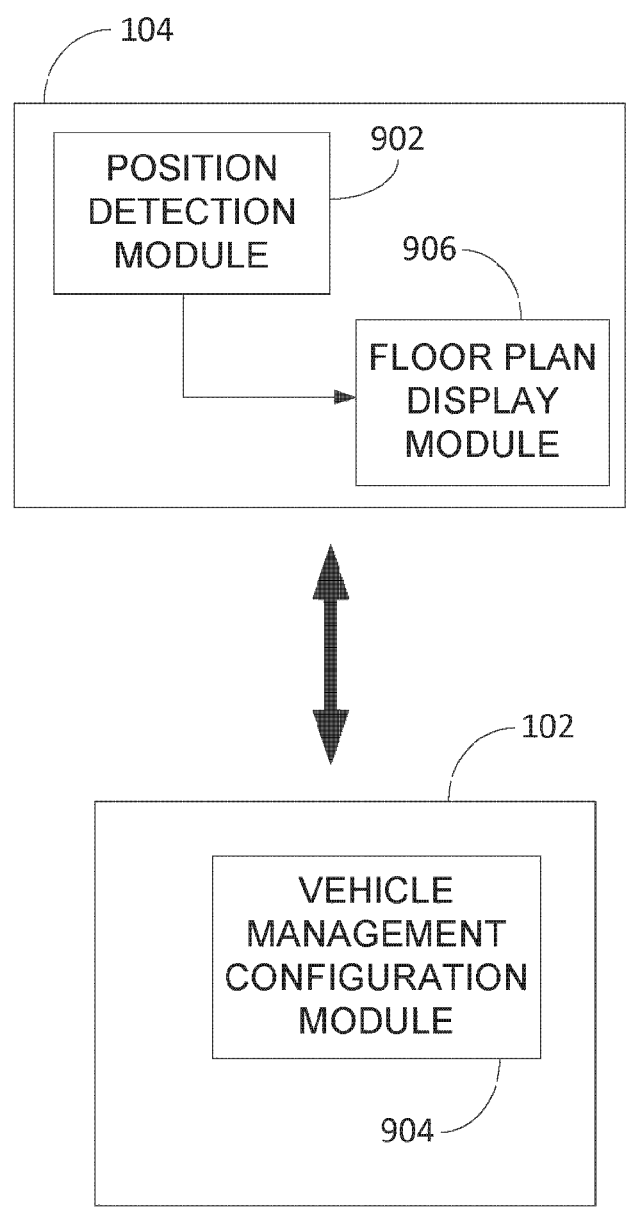
FIG. 10b is a block diagram of another exemplary configuration for the modules illustrated in FIG. 9.
Figure 10C:
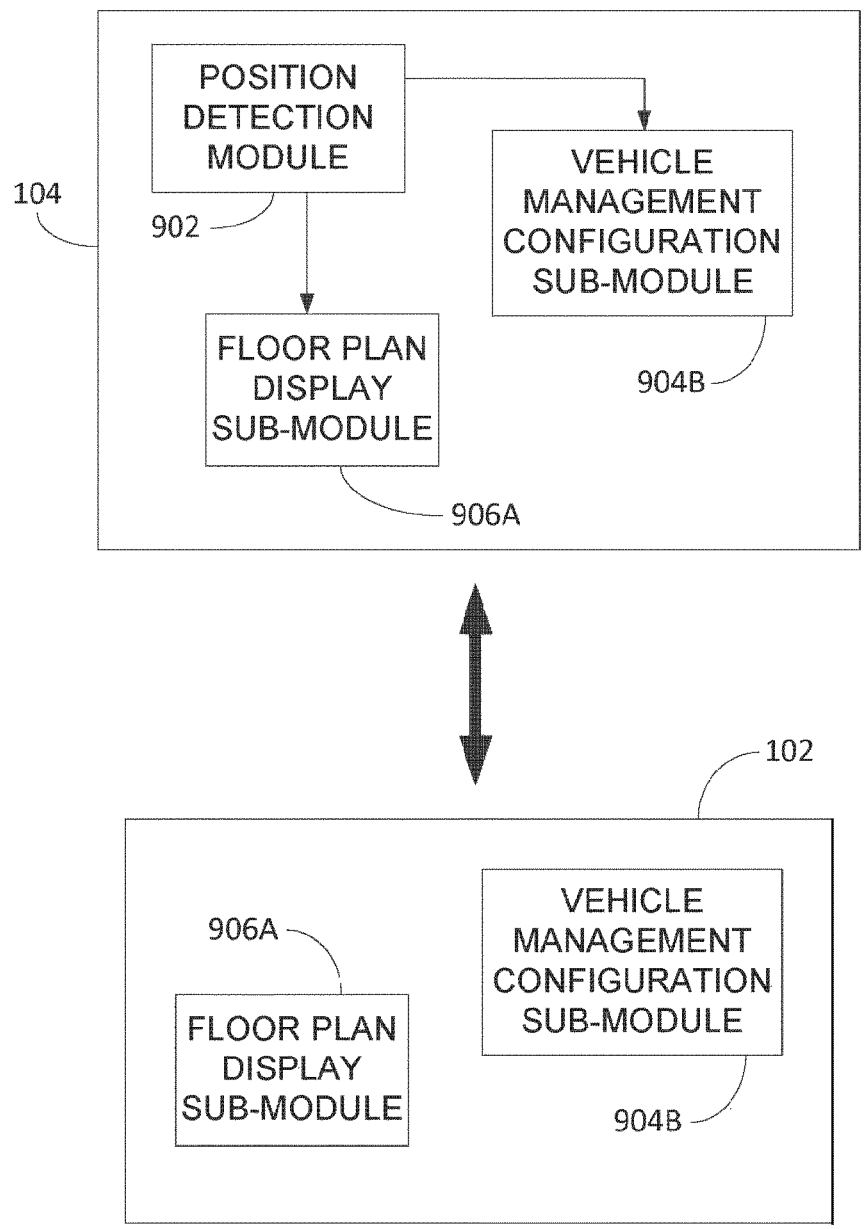
FIG. 10c is a block diagram of yet another exemplary configuration for the modules illustrated in FIG. 9.

In another embodiment, and as illustrated in FIG. 10*b*, the position detection module 902 and the floor plan display module 906 are provided on the personal device 104 and the vehicle management configuration module 904 is provided on the vehicle management system 102. Data generated by the floor plan display module 906 may be transmitted from the personal device 104 to the vehicle management system 102 in order to display the floor plan on the display device of the vehicle management system 102. In yet another embodiment illustrated in FIG. 10*c*, the floor plan display module 906 and/or vehicle management module 904 may be split across the personal device 104 and vehicle management system 102. A first floor plan display sub-module 906*a* and a first vehicle management configuration sub-module 904*a* may be provided on the personal device 104. A second floor plan display sub-module 906*b* and a second vehicle management configuration sub-module 904*b* are provided on the vehicle management system 102. The various tasks performed by the floor plan display module 906 and the vehicle management configuration module 904 may be separated into the sub-modules. For example, the first vehicle management configuration sub-module 904*b* may receive position data from the position detection module 902. It may send an instruction signal to the second vehicle management configuration sub-module 904*b*, instructing it to cause at least one vehicle management component in the first set of vehicle management components to acquire a given status on a basis of a user selection on the personal device, the instructions signal comprising the user selections. The second vehicle management configuration sub-module 904*b* may transmit command signals directly to the one or more vehicle management components in the vehicle to set the appropriate status.

In yet a further embodiment, the functionality of the position detection module 902, vehicle management module 904, and floor plan display module 906 may be performed entirely by the vehicle management system 102. In such an embodiment, the position detection module 902, the floor plan display module 906 and the vehicle management configuration module 904 are provided on the vehicle management system 102. Each different location, zone or passenger seat within the vehicle may be equipped with one or more dedicated antennas that are able to read a chip or integrated circuit from the personal device 104 and detect when the personal device 104 comes into proximity thereof. Based on which antenna within the vehicle detects the proximity of the personal device 104, the position detection module 902 within the vehicle management system 102 is able to determine the location, zone, or seat to which the personal device 104 is in proximity. The passenger may then cause vehicle management components to acquire a given status in a traditional fashion using the controls of the vehicle management components. When the antenna stops detecting the proximity of the personal device 104 and/or a different antenna starts detecting the proximity of the personal device 104, the vehicle management configuration module on the vehicle management system 102 may trigger the event related to one or more of the vehicle management components whose status was selected by the passenger.

Figure 11:
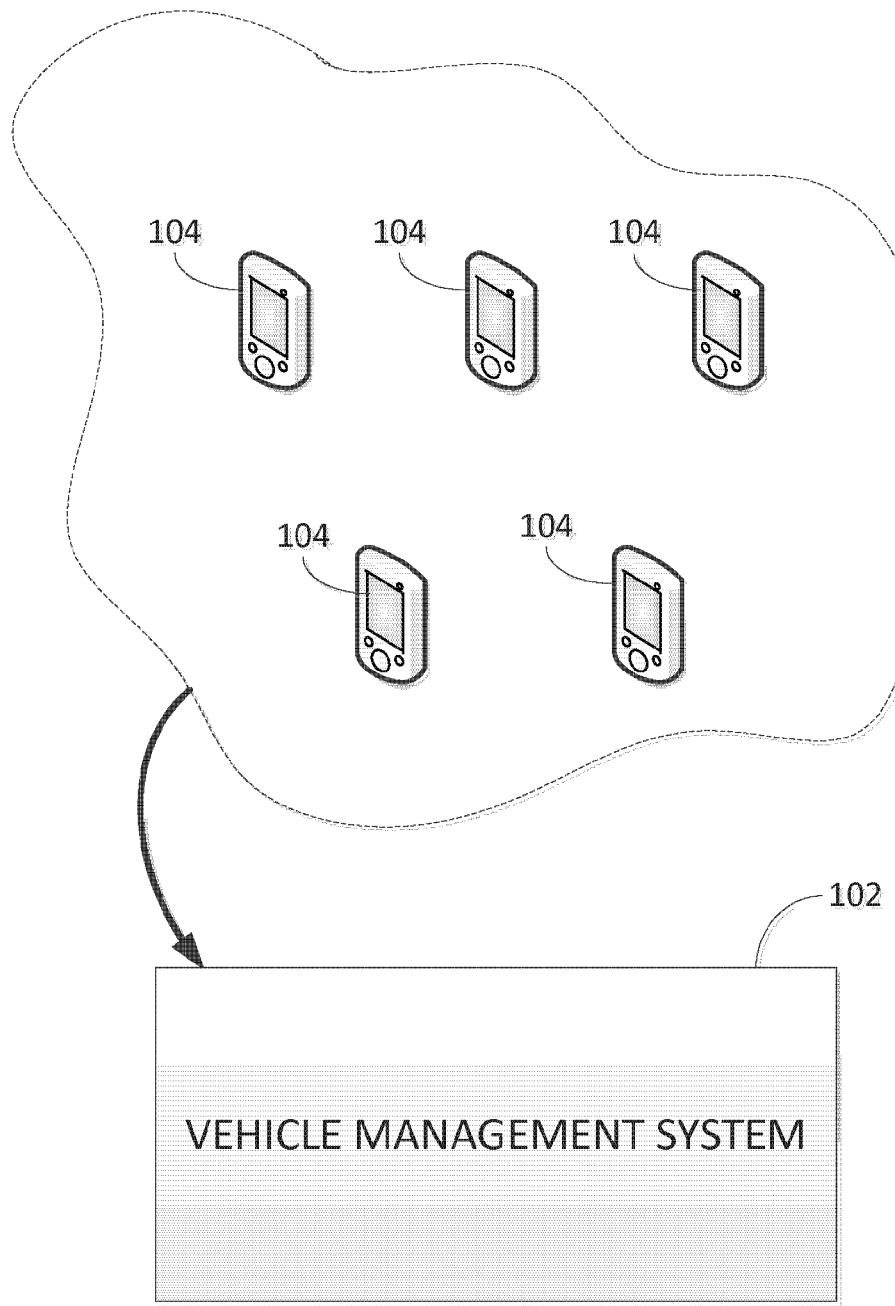
FIG. 11 is a schematic diagram of a vehicle management system communicating with a plurality of personal devices for collectively managing position data.

In some embodiments, the vehicle management system 102 is configured to receive position data from a plurality of personal devices 104, as illustrated in FIG. 11, and manage the information received collectively. For example, the vehicle management system 102 may display a floor plan 302 and identify at each location in the floor plan 302 an associated personal device 104. In some embodiments, passenger identification data may be obtained from the personal device 104, such as a name or other identifier, and provided on the displayed floor plan 302. This feature would allow staff of the vehicle 100 to address personally each individual of the vehicle 100 based on the passenger identification data. Alternatively, the floor plan 302 may simply be populated with generic indicators to show which seats of the vehicle 100 are occupied and which seats are free. Meal or beverage service may also be facilitated on this basis as orders made by passengers may be displayed in association with a given seat on the floor plan 302. In addition, should a passenger change location, the meal or beverage orders previously placed by the passenger may be transferred to the new location, thus allowing the staff of the vehicle 100 to deliver the order to the passenger at his new location without intervention from the passenger.

In some embodiments, the vehicle management system 102 may be used to track passenger displacements within the vehicle for the duration of the trip. Passenger tracking may be used for security reasons, for example to account for each passenger at any given time. It may also be used to obtain detailed information on passenger habits and/or preferences in order to optimize certain aspects of the trip and/or vehicle. For example, passenger tracking may show that one or more designated areas of the vehicle are preferred by a large proportion of passengers and the given designated areas may be enhanced with additional features. Passenger tracking may also show at which moment during a trip passengers are most likely to move around and staff may provide additional amenities at this moment of the trip to help distract and entertain passengers. Passenger tracking, and more generally collective management of the position data from a plurality of individual personal devices 104, may thus be used in a variety of ways by the vehicle management system 102 to provide a more enjoyable and satisfactory experience to passengers.

The personal device 104 and the vehicle management system 102 may thus work together, in some embodiments, to perform the various tasks described above. Other variants to the configurations of the position detection module 902, the vehicle management configuration module 904, and the floor plan display module 906 may also be provided and the examples illustrated are simply for illustrative purposes.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The present disclosure may be embodied in other specific forms without departing from the subject matter of the claims. Also, one skilled in the relevant arts will appreciate that while the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A method for configuring vehicle management components, the vehicle comprising at least a first set of vehicle management components associated with at least one of a first passenger seat or a first passenger position at a first location and a second set of vehicle management components associated with at least one of a second passenger seat or a second passenger position at a second location, the method comprising:
    determining a position of a personal device in relation to the first location on a basis of an indoor positioning system within the vehicle;
    when the personal device is determined to be in proximity to the first location, associating passenger settings to the at least one of the first passenger seat or the first passenger position and causing at least one vehicle management component in the first set of vehicle management components to acquire a given status on a basis of a user selection and of said passenger settings;
    determining, while the vehicle is in transit, that the position of the personal device has moved out of proximity of the first location and into proximity of the second location; and
    upon determining that the position of the personal device has moved out of proximity of the first location, associating said passenger settings to the at least one of the second passenger seat or the second passenger position and triggering an event related to the at least one vehicle management component in the first set of vehicle management components.

2. The method of claim 1, wherein triggering an event comprises transferring the given status of the at least one vehicle management component in the first set of vehicle management components to an equivalent at least one vehicle management component in the second set of vehicle management components.

3. The method of claim 1, wherein triggering an event comprises displaying a message on the personal device related to the at least one vehicle management component.

4. The method of claim 1, wherein the at least one vehicle management component comprises at least one of video entertainment and audio entertainment, wherein the given status of the at least one of video entertainment and audio entertainment is active, and wherein triggering an event comprises modifying the given status to paused.

5. The method of claim 1, wherein causing at least one vehicle management component in the first set of vehicle management components to acquire a given status comprises activating at least one of video entertainment and audio entertainment of an in-vehicle entertainment system.

6. The method of claim 1, wherein causing at least one vehicle management component in the first set of vehicle management components to acquire a given status comprises activating at least one of heating, ventilation, and air conditioning at a given setting.

7. The method of claim 1, wherein causing at least one vehicle management component in the first set of vehicle management components to acquire a given status comprises registering at least one of a meal and a beverage selection.

8. The method of claim 1, further comprising displaying on the personal device a floor plan of the vehicle, and displaying an indicator showing the position of the device in relation to the first location and the second location on the floor plan.

9. The method of claim 8, wherein displaying on the personal device a floor plan of the vehicle comprises updating the position of the personal device when it has been determined that the position of personal device has moved out of proximity of the first set of vehicle management components and into proximity of the second set of vehicle management components.

10. A system for configuring vehicle management components, the vehicle comprising at least a first set of vehicle management components associated with at least one of a first passenger seat or a first passenger position at a first location and a second set of vehicle management components associated with at least one of a second passenger seat or a second passenger position at a second location, the system comprising:
 a memory;
 a processor coupled to the memory; and
 an application stored in the memory and executable by the processor for:
  determining a position of a personal device in relation to the first location on a basis of an indoor positioning system within the vehicle;
  when the personal device is determined to be in proximity to the first location, associating passenger settings to the at least one of the first passenger seat or the first passenger position and causing at least one vehicle management component in the first set of vehicle management components to acquire a given status on a basis of a user selection and of said passenger settings;
  determining, while the vehicle is in transit, that the position of the personal device has moved out of proximity of the first location and into proximity of the second location; and
  upon determining that the position of the personal device has moved out of proximity of the first location, associating said passenger settings to the at least one of the second passenger seat or the second passenger position and triggering an event related to the at least one vehicle management component in the first set of vehicle management components.

11. The system of claim 10, wherein triggering an event comprises transferring the given status of the at least one vehicle management component in the first set of vehicle management components to an equivalent at least one vehicle management component in the second set of vehicle management components.

12. The system of claim 10, wherein triggering an event comprises displaying a message on the personal device related to the given status of the at least one vehicle management component.

13. The system of claim 10, wherein the at least one vehicle management component comprises at least one of video entertainment and audio entertainment, wherein the given status of the at least one of video entertainment and audio entertainment is active, and wherein triggering an event comprises modifying the given status to paused.

14. The system of claim 10, wherein causing at least one vehicle management component in the first set of vehicle management components to acquire a given status comprises activating at least one of video entertainment and audio entertainment of an in-vehicle entertainment system.

15. The system of claim 10, wherein causing at least one vehicle management component in the first set of vehicle management components to acquire a given status comprises activating at least one of heating, ventilation, and air conditioning at a given setting.

16. The system of claim 10, wherein causing at least one vehicle management component in the first set of vehicle management components to acquire a given status comprises registering at least one of a meal and a beverage selection.

17. The system of claim 10, further comprising displaying on the personal device a floor plan of the vehicle, and displaying an indicator showing the position of the device in relation to the first location and the second location.

18. The system of claim 17, wherein displaying on the personal device a floor plan of the vehicle comprises updating the position of the personal device when it has been determined that the position of personal device has moved out of proximity of the first set of vehicle management components and into proximity of the second set of vehicle management components.

19. The system of claim 11, wherein the processor and application are provided on the wireless-enabled device.

20. A method for providing a floor plan for a vehicle, the method comprising:
 determining a position of a personal device in relation to the floor plan of the vehicle;
 associating a first seat in the floor plan with the personal device when the personal device is determined to be in proximity to a first seat, wherein associating a first seat in the floor plan with the personal device comprises assigning passenger settings to the first seat on a basis of a user selection on the personal device;
 displaying, on one or both of the personal device and a display device of a vehicle management system, the floor plan and an indicator showing the first seat associated with the personal device;
 determining on a basis of signals from wireless emitters positioned at known locations within the vehicle, while the vehicle is in transit, that the position of the personal device has moved out of proximity of the first seat and into proximity of a second seat;

associating the second seat in the floor plan with the personal device, and associating said passenger settings to the second seat; and updating the floor plan on the one or both of the personal device and the display device of the vehicle management system by displaying the indicator for the second seat.

* * * * *